United States Patent
Schmutzler

(10) Patent No.: US 7,287,640 B1
(45) Date of Patent: Oct. 30, 2007

(54) ROLLER CONVEYOR ZONE WITH MOTORIZED ROLLER

(75) Inventor: Steven Lee Schmutzler, Homer Glen, IL (US)

(73) Assignee: Automotion, Inc., Oak Lawn, IL (US)

( * ) Notice: Subject to any disclaimer, the term of this patent is extended or adjusted under 35 U.S.C. 154(b) by 0 days.

(21) Appl. No.: 11/484,400

(22) Filed: Jul. 11, 2006

Related U.S. Application Data

(60) Provisional application No. 60/698,825, filed on Jul. 13, 2005.

(51) Int. Cl.
*B65G 13/06* (2006.01)

(52) U.S. Cl. .............. 198/781.1; 198/781.09; 193/35 A

(58) Field of Classification Search .............. 193/35 A; 198/781.09, 781.1, 788, 789, 790
See application file for complete search history.

(56) References Cited

U.S. PATENT DOCUMENTS

| 4,629,059 A * | 12/1986 | Allinquant ................ 193/35 A |
| 5,348,140 A * | 9/1994 | Clos .......................... 198/790 |
| 6,202,821 B1 * | 3/2001 | Crockett .................. 193/35 A |
| 6,883,660 B2 * | 4/2005 | Bigelow et al. ....... 198/781.06 |
| 2004/0186615 A1 * | 9/2004 | Wielebski et al. ....... 198/781.1 |
| 2006/0086593 A1 * | 4/2006 | Brown et al. ............ 198/781.1 |

* cited by examiner

*Primary Examiner*—James R. Bidwell
(74) *Attorney, Agent, or Firm*—Wood, Phillips, Katz, Clark & Mortimer

(57) ABSTRACT

A roller conveyor using a motorized drive roller has the drive roller located other than in the terminal roller position of conveyor zones. Damage to the motorized drive roller from overheating or impact loads is minimized.

5 Claims, 1 Drawing Sheet

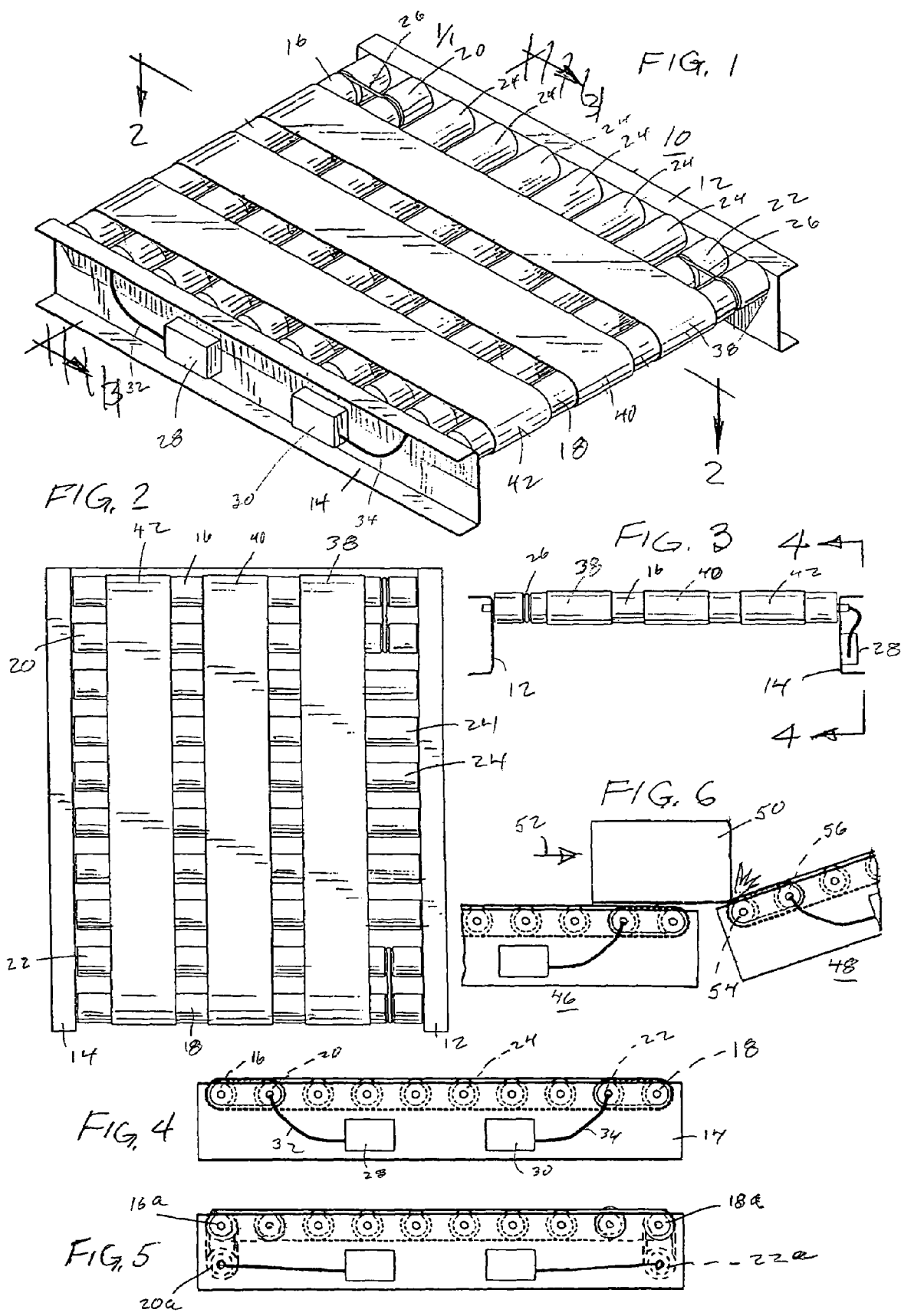

ROLLER CONVEYOR ZONE WITH MOTORIZED ROLLER

CROSS-REFERENCE TO RELATED APPLICATIONS

This application is a continuation in part of Schmutzler Ser. No. 60/698,825 filed Jul. 13, 2005.

BACKGROUND OF THE INVENTION

A roller conveyor may be powered by a motor housed in a cylindrical roller. In such a conveyor the rollers are typically arranged in sections or zones of 8 or more rollers, with one or two motorized drive rollers. One or both of the terminal rollers of the zone is a drive roller. The rollers between the terminal rollers may be driven from the motorized drive roller as by O-ring-like belts. One or more conveyor belts may extend around the terminal rollers and across the intermediate carrying rollers for better traction, or to carry small products. The conveyor belts restrict air flow to the motorized terminal rollers which can lead to overheating and damage to the motor. The terminal roller, particularly at the transition between an inclined zone and a horizontal or level zone, is subject to impacts from conveyed articles which may damage the motor.

BRIEF SUMMARY OF THE INVENTION

The motorized drive roller of a roller conveyor zone is located other than at the terminal position of the zone and is preferably in the plane of the zone rollers, adjacent the terminal roller and serves as a carrying roller. The motorized drive roller has a drive connection to at least the adjacent terminal roller. A conveyor belt extends around the terminal roller. The motorized drive roller is not subject to impact loads which are absorbed by the terminal roller; and the surface of the motorized drive roller is substantially completely exposed to air, enhancing cooling.

BRIEF DESCRIPTION OF SEVERAL VIEWS OF THE DRAWINGS

FIG. 1 is a perspective view of a roller conveyor zone with a motorized drive roller in accordance with the invention;

FIG. 2 is a plan view thereof as indicated by line 2-2 of FIG. 1;

FIG. 3 is an end view thereof looking from the left end of FIG. 1;

FIG. 4 is a side view thereof as indicated by line 4-4 of FIG. 3;

FIG. 5 is a side view of a modified motorized roller drive;

FIG. 6 is a fragmentary side view of a roller conveyor showing the transition from a horizontal zone to an ascending incline zone.

DETAILED DESCRIPTION OF THE INVENTION

A conveyor 10 has spaced apart side plates 12, 14 between which are mounted plurality of rollers that form a level conveying surface. Terminal rollers 16, 18 define a run-on-demand conveyor zone, the operation of which may be controlled to accumulate and move product. In the embodiment shown in FIG. 1-4, motorized drive rollers 20, 22 serve also as product carrying rollers and are located adjacent terminal rollers 16, 18. The motorized drive rollers may be secured from Itoh Denki, USA or other suppliers. Several carrying rollers, 24, are located between motorized drive rollers 20, 22, depending on the length of the zone. The rollers have axles at each end received in openings in the side plates and isolated by plastic bushings (not shown) as described in Houghton U.S. Pat. No. 5,645,155, to reduce noise and wear.

A drive connection, as an O-ring-like drive belt, connects each motorized drive roller, 20, 22 with the adjacent terminal roller, 16, 18. Motor controls 28, 30 are mounted on side plate 14 and connected through electrical cables 32, 34 with the motors (not shown) inside motorized rollers 20, 22. Drive connections (not shown) may also be provided to carrying rollers 24 with O-ring-like drive belts.

Conveyor belts 38, 40 and 42 extend around the terminal rollers 16, 18 and across the motorized rollers 20, 22 and carrying rollers 24. The conveyor belts provide additional traction for conveyed product which is particularly important on an inclined conveyor. The belts also prevent small articles falling between rollers. As noted above, were the motorized roller in the terminal roller position a conveyor belt extends around 180° of the roller surface. This blocks airflow to the roller and leads to overheating which can damage the roller. Where the motorized roller located other than in the terminal position the likelihood of overheating is reduced.

A modified embodiment of the invention is illustrated in FIG. 5 where the motorized rollers 20a, 22a are off-set below terminal rollers 16a, 18a.

The transition from a horizontal conveyor zone, 46, to an up-incline zone 48 is illustrated in FIG. 6. An article 50, passing through the transition as indicated by arrow 52 strikes the terminal roller 54 of the up-incline zone 48. If the terminal roller 54 were a motorized drive roller, the motor might be damaged by the impact and require replacement. Here, however, the motorized drive roller 56 is not the terminal roller and is isolated by the terminal roller 54 so as not to be subject to the impact load from article 50. Similarly, a source of damage to the motorized drive roller is eliminated.

What is claimed is:

1. A roller conveyor zone, comprising:
   spaced apart side plates;
   at least four rollers mounted between the side plates, the rollers being aligned in a plane, first and second of the rollers being terminal rollers for the zone and third and fourth rollers, between the first and second terminal rollers, each being a motorized drive roller; and
   a conveyor belt extending around the terminal rollers and across the motorized drive rollers,
   the third motorized drive roller adjacent and connected to the first terminal roller,
   the fourth motorized roller adjacent and connected to the second terminal roller.

2. The roller conveyor zone of claim 1 with a plurality of carrying rollers between the two motorized rollers.

3. A roller conveyor zone, comprising:
   spaced apart side plates;
   at least three rollers mounted between the side plates, the rollers being aligned in a plane, two of the rollers being terminal rollers for the zone and a third roller between the terminal rollers being a motorized roller adjacent to and connected with at least one of the terminal rollers, the zone being one element of a transition between a horizontal zone and an up incline or a decline zones, the motorized roller adjacent to and connected with the at least one terminal roller and isolated by the at least one terminal roller so as not to be subject to impact loads.

4. The roller conveyor zone of claim 3 which is an up incline zone receiving articles from a horizontal conveyor zone, the at least one terminal roller of the up incline zone absorbing any impact load from an article entering the up incline zone from the horizontal zone and isolating the motorized drive roller from such impact load.

5. The roller conveyor zone of claim 3 which is a horizontal zone receiving articles from a down incline zone, the at least one terminal roller of the horizontal zone absorbing any impact load from an article entering the horizontal zone from the down incline zone and isolating the motorized roller from such impact load.

* * * * *